（12） United States Patent
Schwarzbach et al.

(10) Patent No.: US 9,080,651 B2
(45) Date of Patent: Jul. 14, 2015

(54) DRIVE APPARATUS FOR DRIVING A WORM OF AN INJECTION MOLDING MACHINE

(71) Applicant: Wittenstein AG, Igersheim (DE)

(72) Inventors: Michael Schwarzbach, Tauberbischofsheim (DE); Dieter Uhl, Ahorn-Eubigheim (DE)

(73) Assignee: Wittenstein AG, Ingersheim (DE)

( * ) Notice: Subject to any disclaimer, the term of this patent is extended or adjusted under 35 U.S.C. 154(b) by 0 days.

(21) Appl. No.: 14/322,305

(22) Filed: Jul. 2, 2014

(65) Prior Publication Data

US 2015/0013483 A1    Jan. 15, 2015

(30) Foreign Application Priority Data

Jul. 11, 2013  (DE) .......................... 10 2013 107 378

(51) Int. Cl.
*B29C 45/50* (2006.01)
*F16H 19/02* (2006.01)
*B29C 45/76* (2006.01)

(52) U.S. Cl.
CPC ............ *F16H 19/02* (2013.01); *B29C 45/5008* (2013.01); *B29C 45/76* (2013.01); *B29C 2045/5024* (2013.01); *Y10T 74/18792* (2015.01)

(58) Field of Classification Search
CPC ............... B29C 45/76; B29C 45/5008; B29C 2045/5024

USPC .................................................. 425/145, 542
See application file for complete search history.

(56) References Cited

U.S. PATENT DOCUMENTS

| 6,394,780 | B1  |   | 5/2002  | Hehl |        |
|-----------|-----|---|---------|------|--------|
| 7,144,237 | B2  |   | 12/2006 | Ickinger |    |
| 7,270,523 | B2  | * | 9/2007  | Schmidt | 425/145 |
| 8,075,296 | B2  | * | 12/2011 | Taniguchi | 425/145 |
| 8,087,919 | B2  | * | 1/2012  | Schad et al. | 425/145 |
| 8,128,391 | B2  | * | 3/2012  | Taniguchi | 425/145 |

FOREIGN PATENT DOCUMENTS

| DE |   19831482 C1 | 1/2000 |
| DE |   10304578 B3 | 3/2004 |
| DE | 102004023837 B3 | 8/2005 |

* cited by examiner

*Primary Examiner* — Tim Heitbrink
(74) *Attorney, Agent, or Firm* — Bachman & LaPointe, P.C.

(57) ABSTRACT

Drive apparatus (1, 101), in particular for driving a worm of an injection molding machine, which worm is arranged coaxially with respect to an injection molding cylinder, having a housing (9, 109) which is mounted such that it can be displaced in an axial direction of the housing (9, 109) and is fixed rotationally, an output shaft (21, 121) which is mounted non-displaceably and rotatably in the housing (9, 109), a rotational drive (5) which is arranged in the housing (9, 109) for the rotational drive of the output shaft (21, 121), and a translatory drive (3) which is arranged in the housing (9, 109) for the translatory drive of the housing (9, 109).

10 Claims, 2 Drawing Sheets

DRIVE APPARATUS FOR DRIVING A WORM OF AN INJECTION MOLDING MACHINE

BACKGROUND OF THE INVENTION

The invention relates to a drive apparatus and to the use of a drive apparatus for driving a worm of an injection molding machine, which worm is arranged coaxially with respect to an injection molding cylinder.

Drive systems for driving a worm of an injection molding machine, which worm is arranged coaxially with respect to an injection molding cylinder, are known from the prior art. In combined drive systems which consist of a rotating and a linear drive, the two drives are designed in each case as an independent system and are connected by means of a coupling system.

DE 103 04 578 B3 discloses an injection assembly having two motors for the separate driving of two degrees of freedom of a worm. Here, a first motor drives a spindle, on which a spindle nut is arranged. The spindle nut is connected to a second motor which can be displaced together with the spindle nut. The second motor serves to bring about a rotation of the worm.

In the devices from the prior art, a long overall design, a coupling which is subject to wear and a possible rotational play between the two drives can be undesired.

It is an object of the invention to improve drive apparatuses from the prior art; in particular, it is an object of the invention to achieve optimization of the force flow, a compact overall design, high reliability or play-free coupling of the rotating and linear movement, or to make a coupling superfluous.

SUMMARY OF THE INVENTION

The object is achieved by way of a drive apparatus as described hereinbelow.

A first aspect of the invention relates to a drive apparatus, in particular for driving a worm of an injection molding machine, which worm is arranged coaxially with respect to an injection molding cylinder, having a housing which is mounted such that it can be displaced in an axial direction of the housing and is fixed rotationally, an output shaft which is mounted non-displaceably and rotatably in the housing, a rotational drive which is arranged in the housing for the rotational drive of the output shaft, and a translatory drive which is arranged in the housing for the translatory drive of the housing relative to a locating bearing.

A further aspect relates to the use of a drive apparatus in one of the typical embodiments for driving a worm of an injection molding machine, which worm is arranged coaxially with respect to an injection molding cylinder.

In typical embodiments of the invention, the housing is mounted by way of one or more bearings which are displaceable and are fixed in the torsional direction. For example, the housing is arranged displaceably on two rods which are oriented in the axial direction of the output shaft. Here, the axial direction denotes a direction which is oriented in the direction of the rotational axis of the output shaft. The drive apparatus is typically set up for driving the output shaft with two degrees of freedom. The degrees of freedom are typically rotational and translatory in the direction of the rotational axis of the output shaft.

In typical drive apparatuses, the rotational drive comprises a rotational stator which is connected to the housing in a fixed manner. The translatory drive usually has a translatory stator which is connected to the housing in a fixed manner. The rotational drive and the translatory drive are typically configured in each case as electric motors. In customary embodiments of the invention, the rotational drive and the translatory drive are configured as electric hollow shaft motors. A compact drive is produced in this way.

Typical drive apparatuses of the invention comprise a translatory drive with a spindle rotor which interacts with a spindle shaft. The spindle shaft is preferably arranged at least partially coaxially within the spindle rotor. In embodiments, the spindle shaft is fixed completely. This means, in particular, that the spindle shaft is immovable. In typical embodiments, the housing can therefore be displaced relative to the spindle shaft. In further embodiments, the spindle shaft can also rotate. A fixed spindle shaft affords a reliable abutment which can be of particularly rigid configuration. In typical embodiments of drive apparatuses, the spindle shaft is mounted in a rotationally fixed and axially non-displaceable manner, in particular in a rotationally fixed and axially non-displaceable manner with respect to a housing of an injection molding machine. A reliable abutment is produced as a result.

The spindle shaft is usually hollow throughout. In this way, shafts can be guided through the spindle shaft. In typical embodiments of the invention, at least part of the output shaft is arranged coaxially within the spindle shaft. A compact design is achieved in this way. In customary embodiments of the invention, the housing is mounted displaceably on the spindle shaft with an anti-rotation safeguard. A compact design is achieved in this way, since a mounting can already be arranged between the spindle shaft and the housing. An anti-rotation safeguard can be configured, for example, by way of grooves, rails or by way of an oval or polygonal section of the spindle shaft.

The rotational drive of typical embodiments comprises a rotor which is coupled to the output shaft in a fixed manner. A direct transmission of force is achieved in this way. The rotor is typically mounted rotatably with respect to the housing. Rotors of embodiments which are mounted non-displaceably with respect to the housing afford the possibility of an attachment of the output shaft to the housing, which attachment is non-displaceable in the axial direction and is therefore rigid.

In customary drive apparatuses of the invention, the rotor is of hollow configuration, the drive apparatuses being set up in such a way that, at least in one operating state of the drive apparatus, the spindle shaft is arranged at least partially within the rotor. In typical drive apparatuses of the invention, the spindle rotor is of hollow configuration, the drive apparatuses being set up in such a way that, at least in one operating state of the drive apparatus, the spindle shaft is arranged at least partially within the spindle rotor. An operating state of this type can be, for example, an operating state, in which the spindle shaft has been moved into the housing to a particularly great extent. A particularly compact overall design is achieved by way of the hollow components of spindle rotor and rotor.

The spindle rotor is typically mounted rotatably at a first axial end partially within the rotor. An intermediate bearing or radial/axial bearing is typically arranged between the spindle rotor and the rotor, in order to mount the spindle rotor on both sides, but to decouple a rotation between the spindle rotor and the rotor. The spindle rotor is typically mounted at its second axial end in the housing. Reliable support is produced in this way and the force flow advantageously runs within the rotating components. This increases the rigidity in the drive and minimizes the risk of failure, since critical components and interfaces, such as the housing or the adhesive bond between stators and housing, are virtually load-free.

BRIEF DESCRIPTION OF THE DRAWINGS

Further advantages and features of preferred embodiments of the invention will be explained in the following text using the appended drawings, in which.

DETAILED DESCRIPTION

Figure 1:
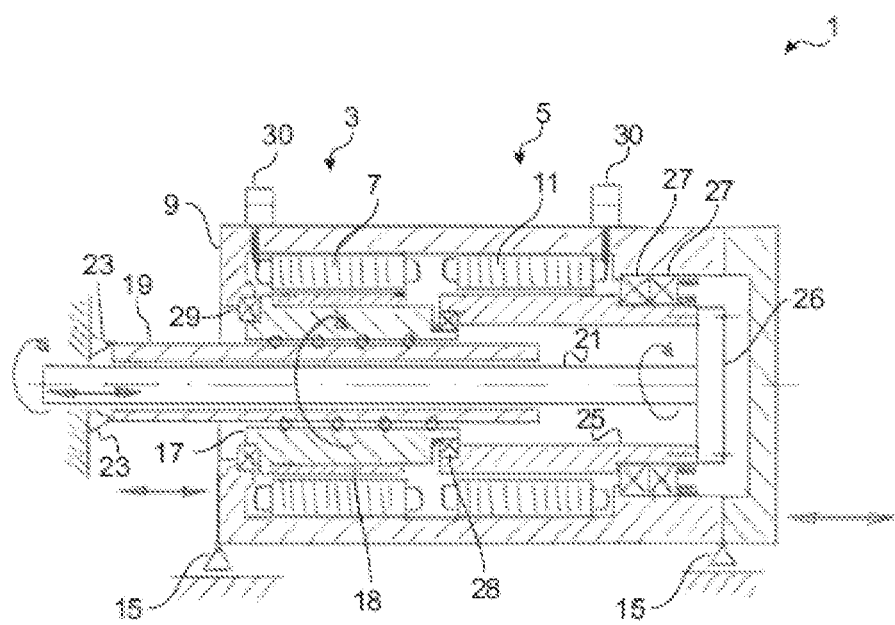
FIG. 1 shows a diagrammatic sectional view of a first embodiment of a drive apparatus.

FIG. 1 shows a drive apparatus 1 with a translatory drive 3 and a rotational drive 5. The translatory drive 3 comprises a translatory stator 7 which is connected to a housing 9 of the drive apparatus 1 in a fixed manner. The rotational drive 5 comprises a rotational stator 11 which is likewise arranged in the housing 9 in a fixed manner. The rotational stator 11 and the translatory stator 7 are arranged axially one behind another in the housing 9.

The housing 9 is mounted by way of two merely diagrammatically shown bearings 15 such that it can be displaced in the axial direction. The bearings can be configured, for example, as displacement sleeves which are mounted on rods. Further possibilities which are utilized by embodiments are bearing slides or linear guides which are guided on rails. The mounting can take place via elements which are mounted by plain bearings and ball bearings or roller bearings. Moreover, the bearings 15 bring about rotationally locked mounting of the housing 9, with the result that the housing 9 is fixed rotationally.

In addition to the translatory stator 7, the translatory drive 3 comprises a spindle rotor 17 which interacts with a spindle shaft 19. The spindle rotor is configured as a rotationally driven spindle nut and comprises magnets 18 for interaction with the translatory stator 7. The spindle shaft 19 is arranged coaxially within the spindle rotor 17 and can be displaced axially along a rotational axis of an output shaft 21 of the drive apparatus 1 by way of rotation of the spindle rotor 17. In this way, the translatory drive 3 can bring about a displacement of the entire housing 9 relative to the spindle shaft 19. The spindle shaft 19 is of hollow configuration and the output shaft 21 is guided through the hollow spindle shaft 19. The spindle shaft 19 is mounted in a clamped and fixed manner by way of a clamping means 23.

The output shaft 21 is connected fixedly via a washer 26 to a hollow rotor 25, which has magnets, of the rotational drive 5 so as to rotate with it. In the embodiment which is shown, the output shaft 21 and the washer 26 are configured in one piece. In other embodiments, the drive shaft and washer are connected, for example, by way of a press fit or a thread with securing means.

The rotor 25 is mounted without play in the housing 9 by way of two anti-friction bearings 27. Moreover, the two anti-friction bearings 27 are suitable, as a result of the fastening in the housing 9 and to the rotor 25, for preventing axial movements of the rotor 25 relative to the housing 9. The rotor 25 can rotate freely in the housing 9 as a result of the anti-friction bearings 27. The rotor 25 interacts with the rotational stator 11, with the result that a rotation can be imparted to the output shaft 21.

The rotational stator 11 and the translatory stator 7 can be energized independently of one another via in each case one connector 30, with the result that the output shaft 21 can be actuated as desired in the translatory or rotational direction. The rotational drive 5 and the translatory drive 3 are configured as electric drives.

In the described embodiments of FIG. 1, the spindle shaft is connected to the machine construction in a rotationally fixed manner, with the result that the entire drive apparatus is displaced axially. A reverse operating principle is likewise realized in embodiments, in which the spindle shaft rotates and the spindle nut moves axially. The twist torque on the drive apparatus can be absorbed both outside (FIG. 1) and inside (see FIG. 2) of the drive apparatus by way of a structural anti-rotation safeguard. Said anti-rotation safeguard can be brought about by elements which are both mounted using plain bearings and using ball bearings or roller bearings. As a result of the given structural arrangement of the two rotors, a displaceable coupling between the two drives is not necessarily required. Furthermore, the force flow runs within the rotating components and not via the housing. The two drives are preferably installed within one housing, but can also be installed in different housings in further embodiments, the housings typically being connected to one another in a fixed manner or being connected rigidly via a releasable connection.

In a typical embodiment, the power and signal cables are routed to the outside on both sides at the ends of the drive. In a further embodiment, the power and signal cables are routed to the outside only at one end. The electric connectors for the two drives can be situated both at one end of the housing and at both ends and at any desired intermediate positions.

The spindle rotor 17 is mounted at a first of its two ends by way of an intermediate bearing 28 partially within the hollow rotor 25. The intermediate bearing 28 is suitable for absorbing a force in the axial direction, which subjects the spindle rotor 17 to a compressive and tensile load in the axial direction, and a force in the radial direction and therefore for decoupling a rotation between the spindle rotor 17 and the rotor 25. The intermediate bearing 28 is configured as a ball bearing. In further embodiments, roller or needle bearings, in general anti-friction bearings, are provided. Four-point bearings or two two-point bearings which are arranged next to one another are typically used.

The second end in the axial direction of the spindle rotor 17 is mounted in the housing 9 by way of a housing bearing 29. On account of the course of the force in the axial direction exclusively within the rotating parts, the housing bearing 29 has to absorb merely forces in the radial direction. It is therefore typically configured as a radial bearing, typically a radial anti-friction bearing such as a deep-groove ball bearing or a cylindrical roller bearing. In this way, the spindle rotor 17 can be mounted without play between the housing 9 and the hollow rotor 25.

Figure 2:
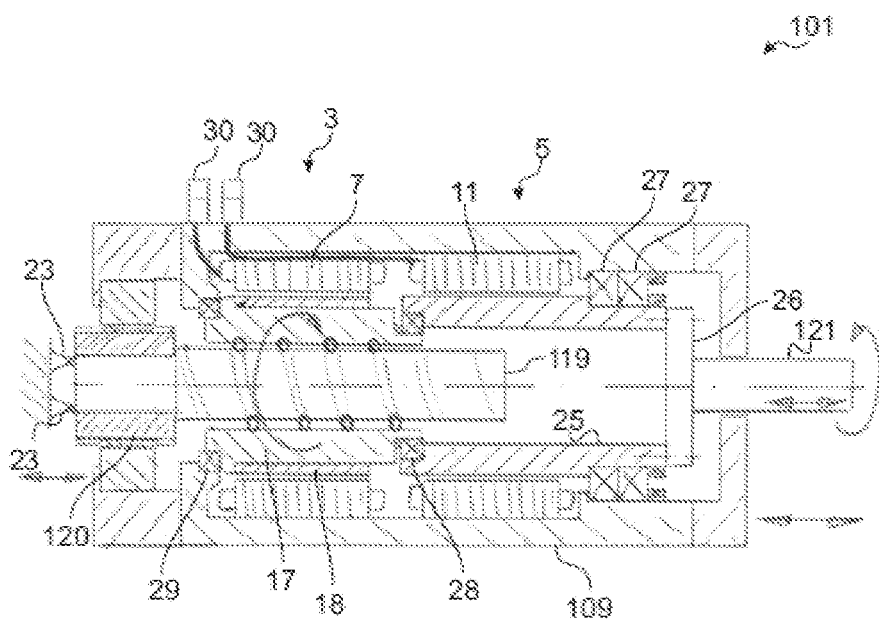
FIG. 2 shows a diagrammatic sectional view of a second embodiment of a drive apparatus.

FIG. 2 shows a further embodiment of a drive apparatus 101, the embodiment of FIG. 2 having numerous identical or similar parts to the embodiment of FIG. 1. All the parts are therefore not described again in detail, and the same reference numerals are used partly for identical or similar parts.

A fundamental difference of the embodiment of the drive apparatus 101 of FIG. 2 from the drive apparatus 1 of FIG. 1 is that, in the drive apparatus 101, a spindle shaft 119 is provided which is configured from solid material. The output shaft 121 of the embodiment of FIG. 2 is not guided through the spindle shaft 119. Rather, the output shaft 121 is guided out at one end of the housing 109, the end, at which the output shaft 121 is guided out of the housing 109, lying opposite the clamping means 23.

A further difference is the anti-rotation safeguard of the housing 109 with respect to the spindle shaft 119. The fixedly mounted spindle shaft 119 comprises a section with grooves 120, in which balls, rollers or generally rolling bodies are arranged which guide the housing 109 in the axial direction and bring about an anti-rotation safeguard. To this end, corresponding structures of the housing 109 interact with the rolling bodies in the grooves 120. The anti-rotation safeguard can also be configured as a plain bearing. Instead of the internal anti-rotation safeguard, the housing can be mounted and secured against rotation via an external mounting in an analogous manner to the exemplary embodiment which was explained in conjunction with FIG. 1.

The invention has been described with reference to embodiments, but the embodiments are not to be understood to be restrictive. Rather, the scope of the invention is defined by the claims.

The invention claimed is:

1. A drive apparatus for driving a worm of an injection molding machine, which worm is arranged coaxially with respect to an injection molding cylinder, comprising:
   (a) a housing which is mounted such that it can be displaced in an axial direction of the housing and is fixed rotationally;
   (b) an output shaft which is mounted non-displaceably and rotatably in the housing;
   (c) a rotational drive which is arranged in the housing for the rotational drive of the output shaft; and
   (d) a translatory drive which is arranged in the housing for the translatory drive of the housing,
wherein the translatory drive comprises a spindle rotor which interacts with a spindle shaft, the spindle shaft is mounted in a rotationally fixed and axially non-displaceable manner.

2. A drive apparatus according to claim 1, wherein the rotational drive comprises a rotational stator which is connected to the housing in a fixed manner, and the translatory drive comprises a translatory stator which is connected to the housing in a fixed manner.

3. A drive apparatus according to claim 1, wherein the spindle shaft is arranged at least partially coaxially within the spindle rotor.

4. A drive apparatus according to claim 1, wherein the spindle shaft is hollow throughout and at least part of the output shaft is arranged coaxially within the spindle shaft.

5. A drive apparatus according to claim 1, wherein the housing is mounted displaceably on the spindle shaft with an anti-rotation safeguard.

6. A drive apparatus according to claim 1, wherein the rotational drive comprises a rotor which is coupled to the output shaft in a fixed manner.

7. A drive apparatus according to claim 6, wherein the rotor and/or the spindle rotor is hollow.

8. A drive apparatus according to claim 7, wherein the spindle rotor is mounted rotatably at a first axial end partially within the rotor.

9. A drive apparatus according to claim 1, wherein the spindle shaft is mounted in a rotationally fixed and axially non-displaceable manner with respect to a housing of an injection molding machine.

10. A drive apparatus according to claim 1, wherein the drive apparatus comprises a worm of an injection molding machine, wherein the worm is arranged coaxially with respect to an injection molding cylinder.

* * * * *